2,962,353

MANUFACTURE OF TITANIUM TETRACHLORIDE UTILIZING HYDROGEN CHLORIDE

Jerome N. Haimsohn, Ardsley, N.Y., assignor to Stauffer Chemical Company, a corporation of Delaware No Drawing. Filed Apr. 18, 1958, Ser. No. 729,234

1 Claim. (Cl. 23—87)

This invention relates to a method of making titanium tetrachloride from low cost titanium carbide and hydrogen chloride, as the major chloride source.

Heretofore, chlorine gas itself has been used almost exclusively as the chlorinating agent in the manufacture of titanium tetrachloride, and the chlorination of titanium carbide, and other titanium source materials, such as ferro-titanium, scrap titanium metal and titanium cyanonitride, with chlorine gas at temperatures between 600° C. and 1000° C., is well-known. It is also known that ferro-titanium and titanium metal can be chlorinated with hydrogen chloride to form titanium tetrachloride.

However, heretofore, it has not been commercially feasible to produce titanium tetrachloride by the reaction of titanium carbide with HCl, because of the low order of reactivity of the carbide with HCl. For example, under conditions ordinarily considered rather severe in the past in the titanium tetrachloride industry (e.g. operation at temperatures of 1000° C. to 1100° C.), conversion rates of the order of only 5% to 10% of the hydrogen chloride have been attained in reaction with commercial titanium carbide, even at low space velocities.

Among the advantages of the present invention is that relatively expensive chlorine gas, is replaced by hydrogen chloride as the major source of chloride value. In addition to its high cost the use of chlorine also results in the chlorination of a number of undesirable impurities, so that titanium tetrachloride which is made from chlorine gas must be further purified to remove the chlorides of vanadium, iron, as well as dissolved chlorine. On the other hand, hydrogen chloride is available at low cost at numerous commercial installations and is a by-product from many chemical reactions. Frequently, there is no demand for HCl and so HCl is available for the purposes of the present invention at little or no cost. Further, when using hydrogen chloride, it is possible to produce titanium tetrachloride of much higher quality, as is hereinafter shown in detail.

One potential source of hydrogen chloride as a chlorinating medium for titanium carbide is from the manufacture of titanium dioxide and particularly the pigment grade of titanium dioxide. The pigment grades of titanium dioxide can be made by the high temperature reaction of titanium tetrachloride with steam. The by-product, HCl, from this reaction, can be recycled to produce additional titanium tetrachloride, thus preventing a completely cyclic system, as follows:

$$TiCl_4 + 2H_2O \rightarrow TiO_2 + 4HCl$$
$$TiC + 4HCl \rightarrow TiCl_4 + 2H_2$$

Another potential source of hydrogen is from the manufacture of titanium metal. High grade titanium metal can be made, under appropriate conditions, from the high temperature reduction of titanium tetrachloride with hydrogen. Though this is a complex process, involving intermediate titanium subchlorides, the overall reaction may be expressed as follows:

$$TiCl_4 + 2H_2 \rightarrow Ti + 4HCl$$

The by-product HCl produced therein can be recycled to produce additional titanium tetrachloride by reaction with titanium carbide, thus providing a completely cyclic process.

I have found that the chlorination of titanium carbide with hydrogen chloride can be carried out at high HCl efficiencies by introducing a minor quantity of chlorine gas continuously with the HCl feed. Although this invention is not predicated upon any theory of its operation, it is believed that the use of a small amount of chlorine, in conjunction with the hydrogen chloride, serves to activate the charge by "burning out" some titanium value present and thereby enhances the reactivity of the titanium carbide with HCl. The amount of chlorine gas, which must be introduced concomitantly with the hydrogen chloride, will vary depending on the reactivity of the particular titanium carbide charge employed. In general, for a given TiC charge, the smaller the particle size and the higher the reaction temperature, the smaller the proportion of chlorine gas to hydrogen chloride required to obtain high HCl conversions. In general, from 3% to 25% by volume of chlorine should be present in the hydrogen chloride stream.

The reaction of the present invention can be conducted in the temperature range of 950° C. to 1400° C. Ordinarily, the charge is preheated to the reaction temperature, and it is possible to carry out the reaction in various manners, such as by means of a fluidized reactor, or by the use of a shaft reactor, properly designed and insulated.

As has been pointed out above, the process of the present invention produces titanium tetrachloride which is much purer than that obtained when chlorine itself is used as the chlorinating medium. Titanium tetrachloride produced from the reaction of chlorine with commercial titanium raw materials is ordinarily heavily contaminated with vanadium, iron, and dissolved chlorine, as well as other undesirable impurities. All of these must be removed to obtain a grade of titanium tetrachloride suitable for titanium metal manufacture. Some of these impurities, such as vanadium, require special and often costly purification steps for their complete removal. The titanium tetrachloride produced in accordance with the present invention from hydrogen chloride, as the major chloride source, is relatively free of such impurities and is almost water-white after entrained solids are permitted to settle out. Comparative analysis of the distilled technical grade titanium tetrachloride made from chlorine and the undistilled material made from reaction with hydrogen chloride (in Example 1) is shown in the following table:

| Impurity | Distilled Technical from Chlorine, p.p.m. | Undistilled, Filtered Crude from Hydrogen Chloride, p.p.m. |
|---|---|---|
| Fe | 50 | <1 |
| V | 1,150 | <10 |
| $Cl_2$ | 750 | <1 |
| S | 120 | <5 |

*Example 1.*—A 393 gram charge of a commercial grade titanium carbide (mesh size −60 plus 150) was placed on top of a gravel bed support in a vertically mounted quartz tube, 4 feet long and 1¾" diameter. The reactor and its contents were then heated in an electrical tube furnace to 1075±10° C., during which time a flow of nitrogen was introduced at a rate sufficient to maintain the charge in a fluidized state. When the temperature reached equilibrium at 1075° C., the nitrogen feed was replaced with dry hydrogen chloride gas, containing a small quantity of chlorine gas. The chlorine rate was 62 ml. (S.C.)/min., representing about 5 volume percent of the HCl rate of 1.25 liters (S.C.)/min. The run was terminated after 230 minutes, during which time 467 grams of HCl and 45 grams of chlorine had passed through the fluidized solids bed. A total of 355 grams of TiCl$_4$ was collected. Assuming, in the most conservative case, that the chlorine gas was completely converted to TiCl$_4$, 61 grams of the 355 gram total TiCl$_4$ were derived from the chlorine. The remaining 294 grams of TiCl$_4$ must then have come from the HCl reaction, and would amount to a net conversion of 48% of the HCl.

*Example 2.*—The process of Example 1 was repeated, except that no chlorine gas was introduced. The HCl feed was 1.25 liters (S.C.)/min. The run was terminated after 230 minutes, during which time 467 grams of HCl had passed through the system. A total of 60 grams of TiCl$_4$ was collected, for a conversion of 10%, based on the HCl.

*Example 3.*—The following runs were carried out in a graphite-lined, electrically heated, insulated reactor 4 feet long, 2 inches I.D., fitted at the bottom with a gas distributor plate surmounted with a support bed of −10 +20 mesh sand. The titanium carbide was charged to reactor to an initial static bed height of about 9 inches. The titanium carbide used in these runs was obtained from a different supplier than that used in Examples 1 and 2, and had the following particle size distribution: 11%, −60 +100 mesh; 73%, −100 +200 mesh; 16%, −200 mesh U.S. sieve. In each case, the charge was brought to reaction temperature while fluidizing with nitrogen. When the desired temperature was achieved, the nitrogen feed was replaced with dry hydrogen chloride gas, along with the indicated amount of chlorine gas, metered in from cylinders. The run conditions and results are summarized as follows:

| Temp., ° C. | Volume Percent | | Superficial Gas Velocity, ft./sec. | Percent HCl Conversion |
|---|---|---|---|---|
| | Cl$_2$ | HCl | | |
| 1,050 | 0 | 100 | 0.30 | 6 |
| 1,000 | 9 | 91 | 0.19 | 52 |
| 1,025 | 17 | 83 | 0.09 | 77 |
| 1,175 | 25 | 75 | 0.31 | 81 |
| 1,350 | 3 | 97 | 0.24 | 89 |

This is a continuation-in-part of my application Serial No. 534,870, filed September 16, 1955, now abandoned.

I claim:

A process for preparing a relatively pure titanium tetrachloride from titanium carbide and chlorinating gases comprising: feeding titanium carbide into a reaction zone maintained at a temperature within the range of about 950° C. to about 1400° C.; feeding into said zone a mixture of chlorinating gases, said chlorinating gases comprising about 95% HCl by volume and about 5% Cl$_2$ by volume, whereby to form said titanium tetrachloride; and withdrawing the said titanium tetrachloride from the said zone.

References Cited in the file of this patent

UNITED STATES PATENTS

| 1,179,394 | Barton | Apr. 18, 1916 |
| 2,184,887 | Muskat et al. | Dec. 26, 1939 |

FOREIGN PATENTS

| 190,714 | Switzerland | July 16, 1937 |